United States Patent [19]

Torget

[11] Patent Number: 5,428,354

[45] Date of Patent: Jun. 27, 1995

[54] GROUND PROXIMITY WARNING SYSTEM FOR NON-RETRACTABLE LANDING GEAR AIRCRAFT

[75] Inventor: Alan B. Torget, Seattle, Wash.

[73] Assignee: AlliedSignal Inc., Morris Township, N.J.

[21] Appl. No.: 148,636

[22] Filed: Nov. 5, 1993

[51] Int. Cl.⁶ .............................................. G08B 23/00
[52] U.S. Cl. .................................. 340/963; 73/178 T; 340/967
[58] Field of Search ............... 340/963, 970, 971, 951, 340/945, 968; 244/89; 73/178 T; 364/428

[56] References Cited

U.S. PATENT DOCUMENTS

| | | | |
|---|---|---|---|
| 3,958,219 | 5/1976 | Bateman et al. | 340/970 |
| 4,030,065 | 6/1977 | Bateman | 73/178 T |
| 4,076,093 | 2/1978 | Mizuno | 340/479 |
| 4,684,948 | 8/1987 | Bateman | 340/970 |
| 4,792,799 | 12/1988 | Grove | 340/970 |
| 4,849,756 | 7/1989 | Bateman | 340/970 |
| 4,914,436 | 4/1990 | Bateman et al. | 340/970 |
| 4,939,513 | 7/1990 | Paterson et al. | 340/970 |
| 4,951,047 | 8/1990 | Paterson et al. | 340/970 |
| 4,987,413 | 1/1991 | Grove | 340/970 |
| 5,038,141 | 8/1991 | Grove | 340/970 |
| 5,187,478 | 2/1993 | Grove | 340/970 |
| 5,208,590 | 5/1993 | Pitts | 340/990 |
| 5,220,322 | 6/1993 | Bateman et al. | 340/970 |

*Primary Examiner*—Brent Swarthout
*Attorney, Agent, or Firm*—Howard G. Massung

[57] ABSTRACT

A ground proximity warning system and a detector for aircraft having fixed or non-retractable landing gear which rather accurately detects a landing phase of flight in order to adjust the warning envelope to minimize nuisance warnings during such a phase of flight. In particular, the system monitors the flap position to provide an indication to the ground proximity warning system that the aircraft is either in an approach, cruise or landing phase of flight. Cams mounted to the air flaps system indicate a landing phase of flight when the approach flaps are configured for a normal landing, such as 16°–18° flaps or an approach phase of flight when the flaps are configured for a normal approach, for example, 5°–7° flaps. By providing a relatively accurate indication of the phase of flight for an aircraft with non-retractable landing gear, nuisance alarms will be virtually eliminated, while maximum protection is provided during all phases of flight.

11 Claims, 8 Drawing Sheets

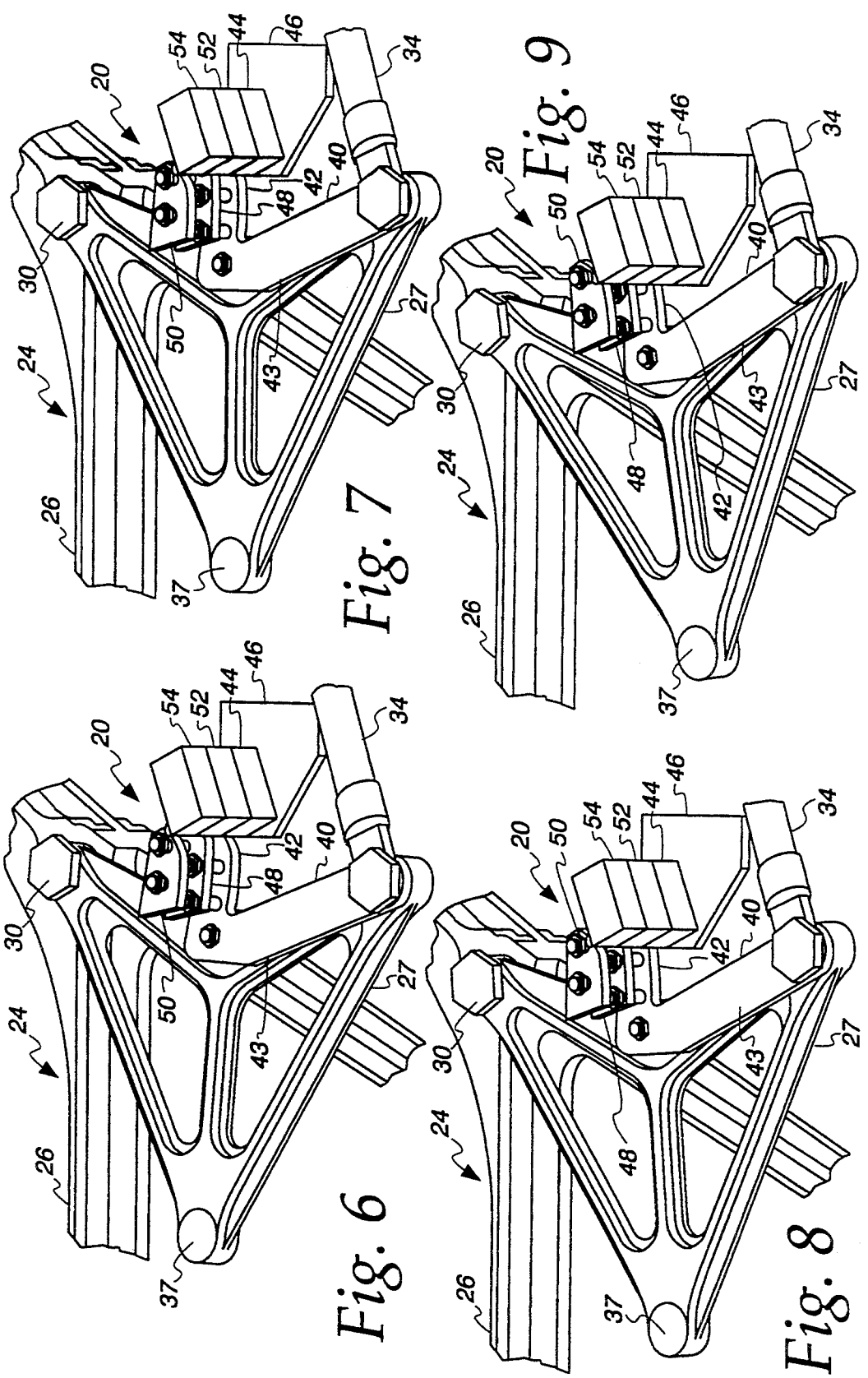

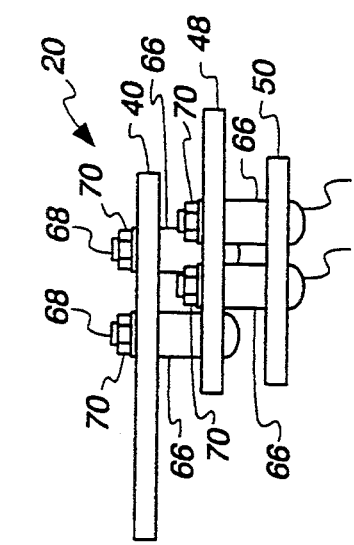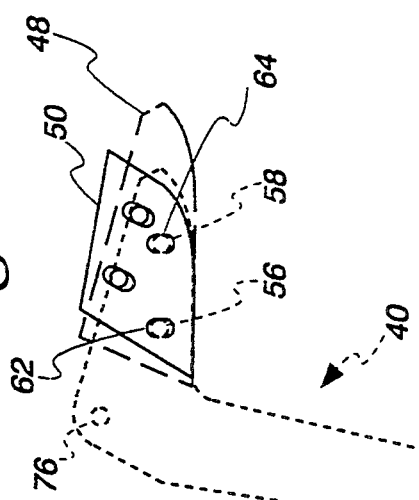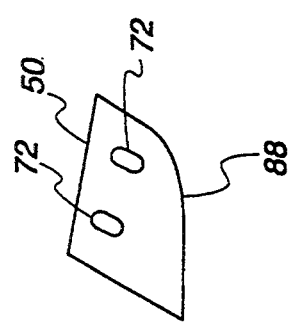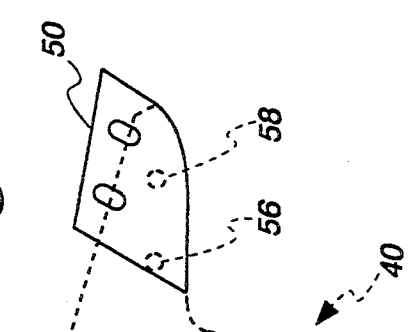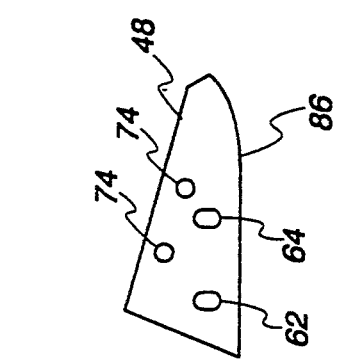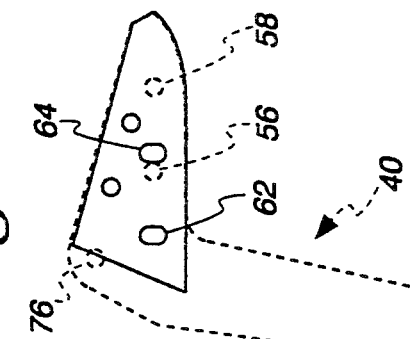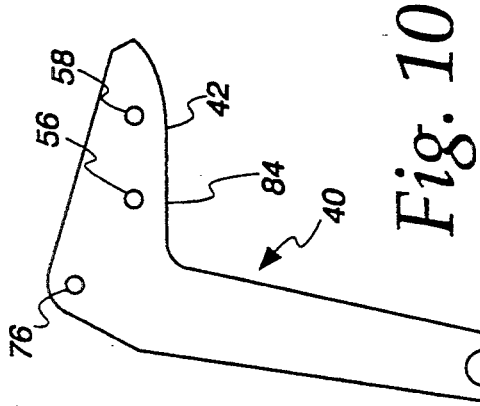

GROUND PROXIMITY WARNING SYSTEM FOR NON-RETRACTABLE LANDING GEAR AIRCRAFT

BACKGROUND OF THE INVENTION

1. Field of the Invention

The field of the invention relates to a ground proximity warning system for an aircraft and, more particularly, to a ground proximity warning system and a detector that is able to sense various phases of flight, such as a landing phase of flight, for aircraft with fixed or non-retractable landing gear, such as a DeHavilland DHC-6 Twin Otter aircraft.

2. Description of the Prior Art

Ground proximity warning systems are generally known in the art. Examples of such systems are disclosed in U.S. Pat. Nos. 4,030,065; 4,792,799; 4,849,756; 4,939,513; 4,951,047; 4,987,413; 5,038,141; 5,187,478 and 5,220,322. Such ground proximity warning systems are used to provide a pilot of an aircraft of an indication of a dangerous flight condition, such as inadvertent contact with terrain. In order to minimize nuisance warnings, detectors are known that detect the phase of flight of the aircraft in order to modify the respective warning envelope during certain conditions. For example, a terrain clearance or Mode 4 warning system normally provides a warning when an aircraft is too close to the terrain when the aircraft is flying above a predetermined speed. An example of such a terrain clearance warning system for aircraft with retractable landing gear is disclosed in U.S. Pat. No. 4,030,065, assigned to the same assignee as the assignee of the present invention and incorporated herein by reference. In such a warning system, the warning envelope is adjusted to prevent nuisance warnings during a landing phase of flight. For retractable landing gear aircraft, the landing phase of flight is normally sensed by way of a discrete or position switch on the landing gear.

Because the landing gear position plays such an important role in ground proximity warning systems, the implementation of such systems on aircraft with non-retractable landing gear, such as the DeHavilland DHC-6 Twin Otter aircraft, have been less than ideal. In such an application, any ground proximity warning system would have to be configured for either a cruise phase of flight or a landing phase of flight. If such a system were normally configured for a cruise phase of flight, nuisance warnings would be generated every time that the aircraft enters a landing phase. Although configuring the warning system for a landing phase of flight would eliminate the nuisance warnings during a landing phase of flight, such a configuration would also eliminate much of the protection for the aircraft in a cruise phase of flight.

In order to resolve these problems, various other approaches are available. For example, one approach is to provide a switch in the cockpit which the pilot of the aircraft would manually set to correspond to the current phase of flight, for example, cruise or landing. This switch would be integrated into the ground proximity warning system in a similar manner as the landing gear discretes are incorporated into the warning systems for aircraft with retractable landing gear. The problem with such an approach is that it is totally dependent upon the diligence of the pilot. Should the pilot forget to set the switch to the current phase of flight, the ground proximity warning systems would either generate nuisance warnings during a landing condition in the event that the switch was left in a cruise phase of flight or, in the event that the switch was left in the landing phase position, provide less than ideal protection during a cruise phase of flight.

Other approaches for detecting the phase of flight of an aircraft with non-retractable landing gear include sensing the airspeed, radio altitude or throttle position. Due to the relatively wide dead band of known airspeed sensors and the relatively low airspeed at which such fixed gear aircraft operate, coupled with the relatively wide range of airspeeds on approach used by such aircraft to enhance separation distance, measurement of airspeed as an indication of a landing phase of flight would provide unacceptable results. Sensing radio altitude would likewise provide unacceptable results because in certain situations, for example, level flight over rising terrain, would falsely indicate a landing phase of flight. Lastly, due to the variance in power settings and, consequently, throttle positions during a landing phase of flight, throttle position is also an unsuitable parameter for detecting a landing phase of flight because of speed variations and, consequently, throttle position variations resulting from the need to provide spacing from other aircraft; the need for additional power if the approach altitude is too low; or a condition when aircraft is in a sinking mass of air.

SUMMARY

It is an object of the present invention to solve various problems of the prior art.

It is yet a further object of the present invention to provide a ground proximity warning system for aircraft having fixed or non-retractable landing gear.

It is yet a further object of the present invention to provide means for reliably detecting a landing phase of flight for aircraft having non-retractable or fixed landing gear.

Briefly, the present invention relates to a ground proximity warning system and a detector for aircraft having fixed or non-retractable landing gear which rather accurately detects a landing phase of flight in order to adjust the warning envelope to minimize nuisance warnings during such a phase of flight. In particular, the system monitors the flap position to provide an indication to the ground proximity warning system that the aircraft is either in an approach, cruise or landing phase of flight. Cams mounted to the air flaps system indicate a landing phase of flight when the approach flaps are configured for a normal landing, such as 16°–18° flaps or an approach phase of flight when the flaps are configured for a normal approach, for example, 5°–7° flaps. By providing a relatively accurate indication of the phase of flight for an aircraft with non-retractable landing gear, nuisance alarms will be virtually eliminated, while maximum protection is provided during all phases of flight.

BRIEF DESCRIPTION OF THE DRAWING

These and other objects of the present invention will be readily apparent from the following specification and attached drawing, wherein:

FIG. 6 is a partial perspective view of the linkage and the detector in accordance with the present invention shown in a flaps-up position;

FIG. 7 is similar to FIG. 6, shown in an approach position;

FIG. 8 is similar to FIG. 6, shown in a stall warning position;

FIG. 9 is similar to FIG. 6, shown in a full-flaps position;

FIG. 10 is a plan view of a known stall warning cam modified in accordance with the present invention;

FIG. 11 is a plan view of a landing cam which forms a portion of the detector in accordance with the present invention;

FIG. 12 is a plan view of an approach cam which forms a portion of the detector in accordance with the present invention;

FIG. 13 is a plan view of the landing cam illustrated in FIG. 11 superimposed over the stall warning cam in FIG. 10 to illustrate the formation of the cam lobe for the landing cam;

FIG. 14 is a plan view of the approach cam illustrated in FIG. 12 superimposed over the stall warning cam to illustrate the formation of a cam lobe on the approach cam;

FIG. 15 is a plan view of the landing cam and the approach cam in accordance with the present invention assembled to a modified known stall warning cam; and FIG. 16 is an elevational view of the stall warning cam assembled to the landing cam and approach cam in accordance with the present invention.

DETAILED DESCRIPTION OF THE PREFERRED EMBODIMENT

Figure 2:
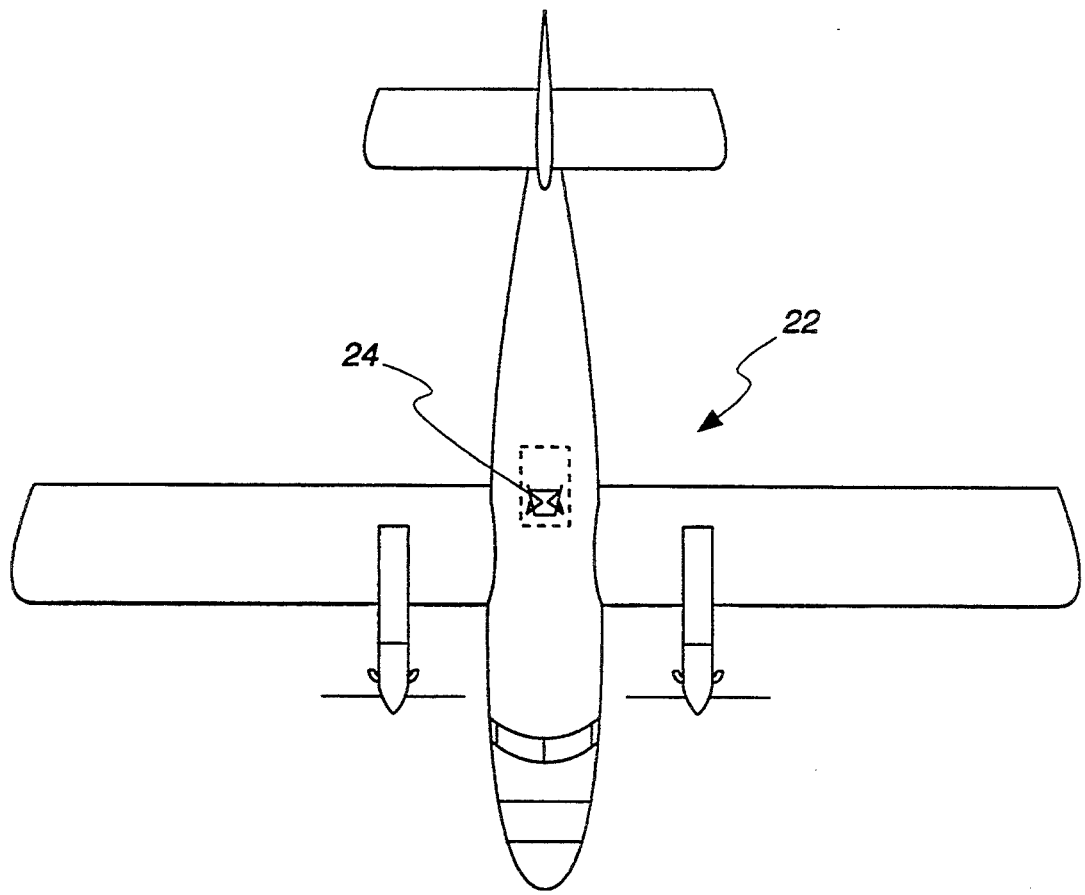
FIG. 2 is a top view of an aircraft having non-retractable landing gear, such as a DeHavilland DHC-6 Twin Otter, shown with a portion of the fuselage cut away to illustrate a known linkage for a known wing flap system.
Figure 3:
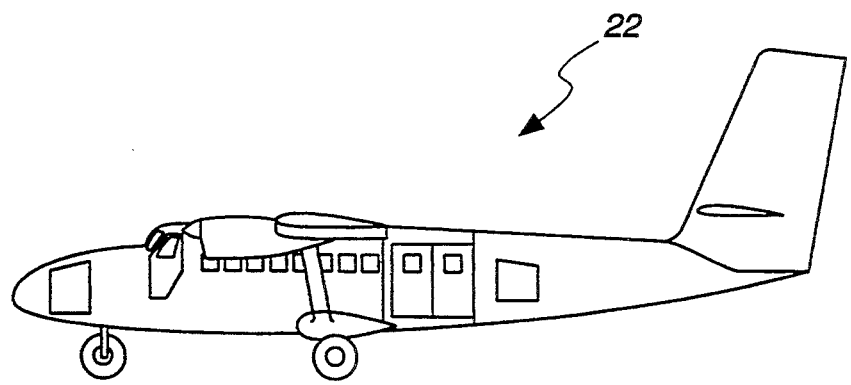
FIG. 3 is a side view of the aircraft illustrated in FIG. 2.

The present invention relates to a ground proximity warning system and a detector for detecting various phases of flight for aircraft with fixed or non-retractable landing gear, such as a DeHavilland DHC-6 Twin Otter aircraft, as illustrated in FIGS. 2 and 3. Ground proximity warning systems are used to warn a pilot of a dangerous flight condition, such as inadvertent contact with the terrain. In order to minimize nuisance warnings and to optimize the protection envelope, such warning systems normally account for the phase of flight of the aircraft. More particularly, such ground proximity warning systems normally adjust the warning envelope during a landing phase of flight in order to minimize nuisance warnings during a landing phase of flight while providing optimum protection during a cruise phase of flight. For aircraft with retractable landing gear, the phase of flight and, in particular, a landing phase is sensed mechanically by a discrete coupled to the landing gear which provides an indication of whether the landing gear is up or down. Thus, for aircraft with retractable landing gear, a landing phase of flight may be sensed relatively easily and accurately. However, for aircraft with non-retractable landing gear, known methods for sensing a landing phase of flight are relatively inaccurate as discussed above. As such, any ground proximity warning system provided on an aircraft with non-retractable landing gear would result in either nuisance warnings during a landing phase of flight or non-optimum protection during a cruise phase of flight.

The present invention solves this problem by providing a detector which relatively accurately detects various phases of flight, such as landing, for aircraft having non-retractable landing gear. By providing relatively accurate sensing of the phase of flight for such aircraft with non-retractable landing gear, the performance of ground proximity warning systems on such aircraft is optimized.

The present invention takes advantage of the normal use of flaps for aircraft with non-retractable landing gear to provide a relatively accurate and simple method for detecting the phase of flight. In particular, it is known that the flaps are used during various phases of flight to provide additional lift and additional drag. In general, the amount of lift versus drag varies with the position of the flap and the aircraft design. During a landing phase of flight, the flaps when configured for landing, provide additional drag as well as lower the stall speed of the aircraft to enable the aircraft to land at relatively lower speeds; consequently, using relatively less runway to minimize the ground speed to provide better control of the aircraft during landing. During a take-off phase of flight, partial flaps (e.g., 10°) are sometimes used. During a take-off phase of flight, the partial flaps provide additional lift, additional drag and a relatively lower airspeed. However, configuring the flaps at greater than, for example, 10°, can result in more drag than lift, thus decreasing the performance of the aircraft during a take-off phase of flight. During an approach phase of flight, the flaps are configured for an approach relatively early in the landing sequence. In the event that the landing is aborted, the flaps are configured in an acceptable position to enable the aircraft to climb away from the runway. On a normal approach, additional flaps are applied to lower the airspeed of the aircraft and to configure the aircraft for actual landing.

The detector in accordance with the present invention detects the position of the flaps during the various phases of flight to provide automatic and relatively accurate indication of the phase of flight of the aircraft. For example, the detector is adapted to detect when the approach flaps are selected (e.g., 5°–7°). By providing an indication of an approach phase of flight, nuisance warnings can be minimized, if not eliminated, during an approach and landing phase of flight while providing optimum protection during a cruise phase of flight. In addition, the detector also detects when the aircraft is configured for landing by sensing when the flaps are, for example, between 15°–17°. This enables the ground proximity warning system to be tested, which is normally done below 50 feet of radio altitude. The detector also provides an indication of a flap selection that would result in a stall warning, for example, 12°. The stall warning detector is not a part of the present invention.

It is to be understood by those of ordinary skill in the art that although a specific implementation of the detector in accordance with the present invention is described and illustrated, the principles of the invention are applicable to various types of aircraft with non-retractable landing gear. In particular, as illustrated and described, a detector in accordance with the present invention, generally identified with the reference numeral 20, is illustrated in FIGS. 5–16 and described below for use with a DeHavilland DHC-6 Twin Otter aircraft 22, as generally illustrated in FIGS. 2 and 3. As shown in FIGS. 5–9, the detector 20 is coupled to a known linkage 24 for a known wing flap system, for example, as described in detail in DeHavilland Aircraft Maintenance Manual 27-50-00, wherein incorporated by reference, used to adjust the position of the flaps for a DeHavilland DHC-6 Twin Otter aircraft 22. Although the linkage for various aircraft with non-retractable landing gear may vary, the principles of the invention are applicable to all such aircraft.

Figure 4:
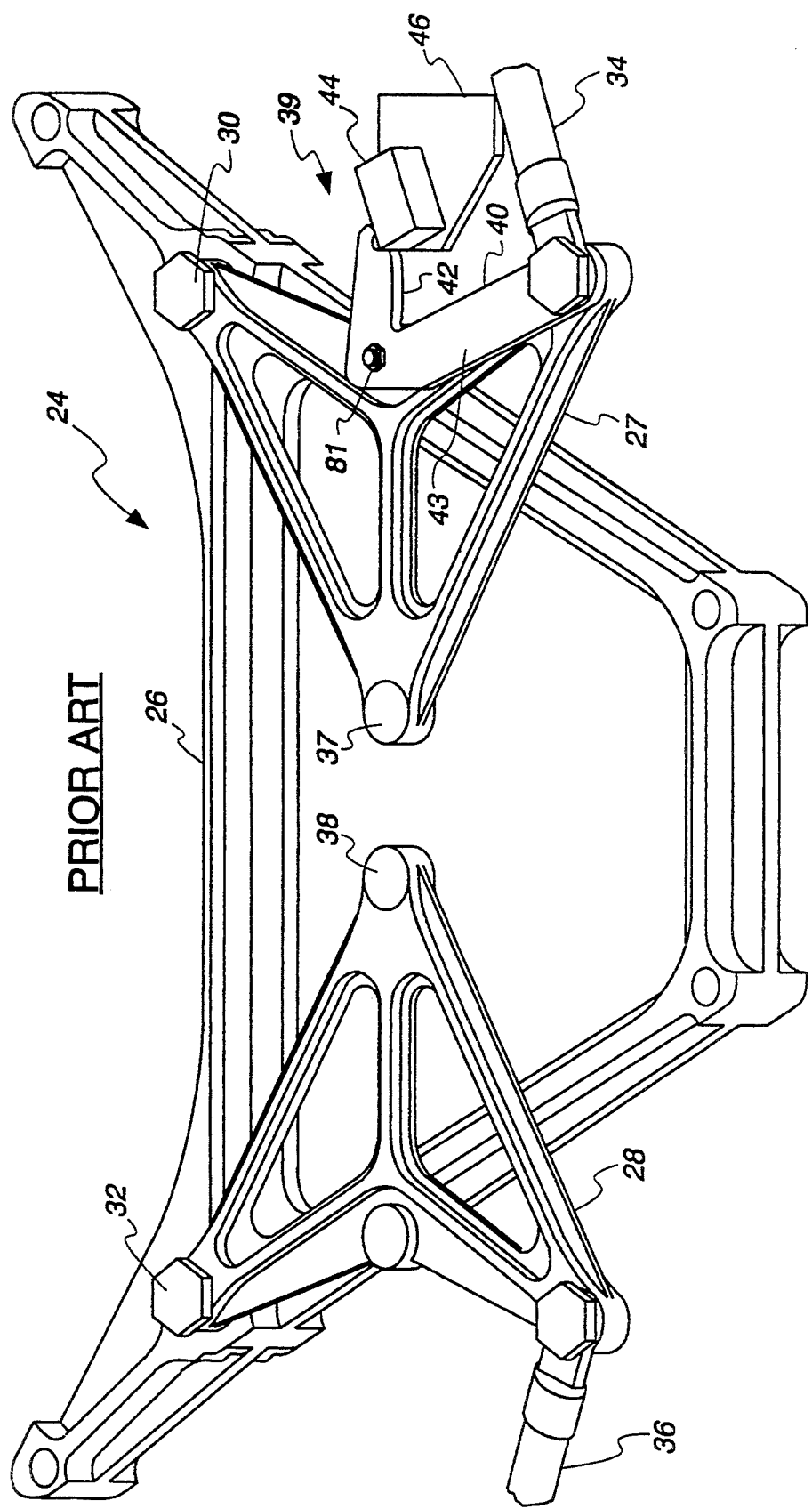
FIG. 4 is an enlarged view of the known linkage for the wing flap system shown in FIG. 2 which illustrates a known stall warning detector.

Referring to FIG. 4, a known linkage for a wing flap system for adjusting the position of the flaps for a DeHavilland DHC-6 Twin Otter aircraft is shown. The linkage 24 includes a fixed frame 26 rigidly secured to the airframe (not shown) of the aircraft 22 and two rotatably mounted brackets 27 and 28. The bracket 27 is adapted to control the flaps on the wing on the pilot side of the aircraft, while the bracket 28 is adapted to control the flaps on the wing on the co-pilot side of the aircraft. Each bracket 27, 28 is rotatably connected to the frame 26 at pivot points 30 and 32, respectively. The rotation of the brackets 27 and 28 is under the control of a pair of reciprocally mounted control members 34 and 36. The control members 34 and 36 are, in turn, connected to the wing flap system (which does not form a portion of the present invention) which enables the pilot or the co-pilot to control the position of the flaps. The brackets 27 and 28 rotate together to cause reciprocal movement of points 37, 38 of the brackets 27, 28, respectively. Movement of the portions 37, 38 on the brackets 27, 28, respectively, causes movement of the flaps on the wings on both the pilot and co-pilot side of the aircraft.

FIG. 4 also shows a known stall warning detector 39 used to provide a stall warning as a function of the airspeed of the aircraft and the position of the flaps. The stall warning sensor includes a stall warning cam 40, for example, a DeHavilland Part No. C6CFM1274-27. The stall warning cam 40 is an L-shaped member that includes a cam lobe portion 42 and a depending leg portion 43. The cam lobe portion 42 cooperates with a microswitch 44 rigidly mounted to the airframe by way of a bracket 46. In operation, as the bracket 27 rotates under the influence of the control member 34, the cam 40 rigidly attached to the bracket 27 rotates therewith. Thus, as the bracket 27 rotates, the cam lobe portion 42 actuates the microswitch 4 when the flaps are in a stall warning position.

Figure 5:
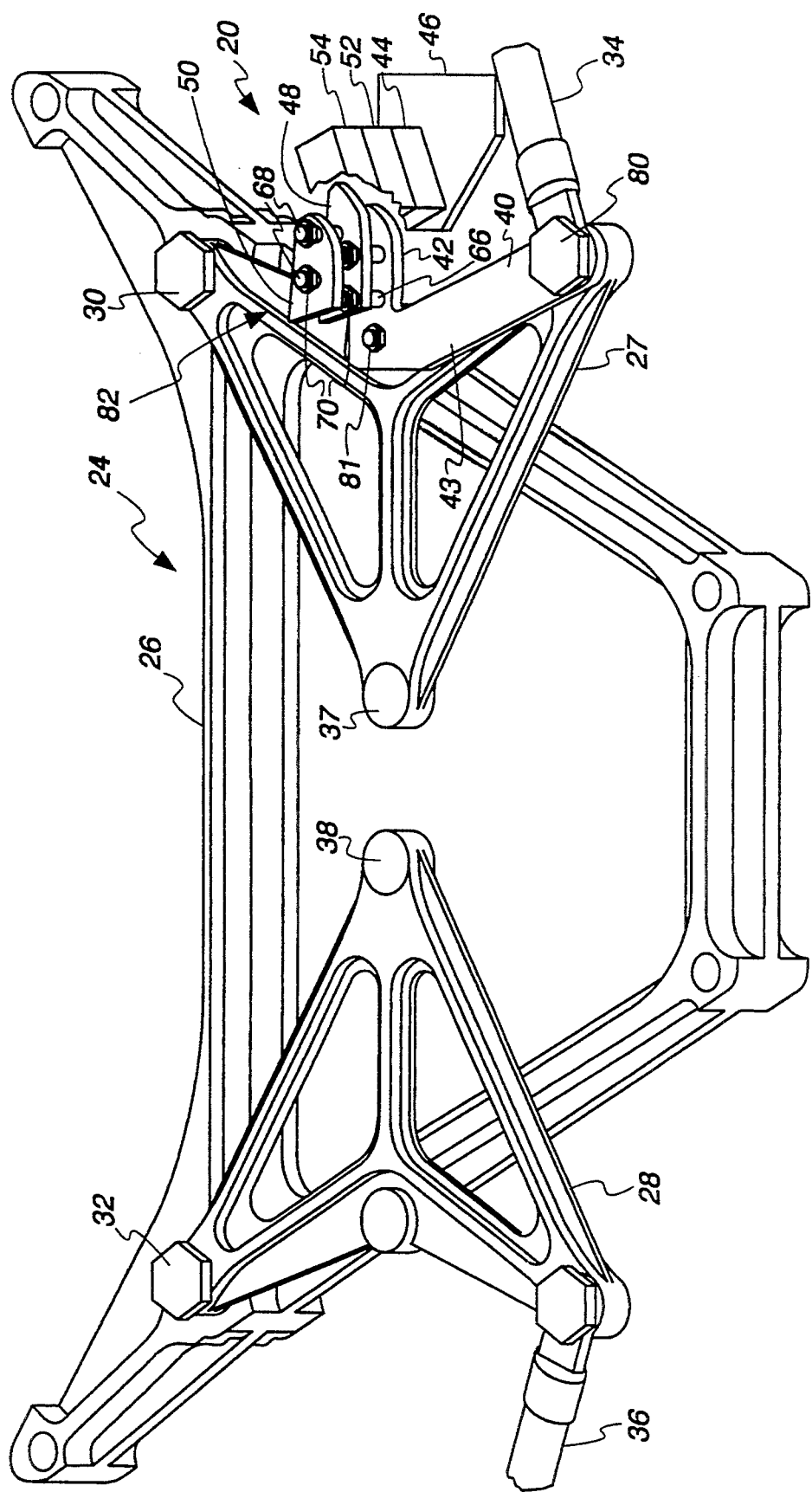
FIG. 5 is an enlarged view of the linkage illustrated in FIG. 4, shown with the addition of an approach cam and a landing cam as well as additional microswitches, partially cut away, which forms the detector for detecting various phases of flight in accordance with the present invention.

Referring to FIG. 5, the detector 20 in accordance with the present invention includes a landing cam 48, an approach cam 50, a landing microswitch 52 and an approach microswitch 54. As will be discussed in more detail below, the stall warning cam 40 is modified to enable the landing cam 48 and the approach cam 50 to be mechanically coupled thereto. In addition, two additional microswitches 52 and 54 for landing and approach, respectively, are stacked on the stall warning microswitch 44 as best shown in FIG. 16. The additional microswitches 52 and 54 are adapted to cooperate with the landing cam 48 and the approach cam 50 to provide an indication when the flaps are configured for landing or approach, respectively. These microswitches 52 and 54 are coupled to a ground proximity warning system computer 55 (FIG. 1B) to enable the protection envelope during a cruise phase of flight to be optimized, while minimizing nuisance warnings during an approach or landing phase of flight. In addition, the landing microswitch 52 enables the ground proximity warning system to be tested when the aircraft is in a landing configuration and the radio altitude is less than 50 feet.

As best illustrated in FIGS. 5 and 16, the landing cam 48 and the approach cam 50 are mechanically coupled to the stall warning cam 40. In particular, the stall warning cam 40 (FIG. 10) is modified in accordance with the present invention with the addition of two apertures 56 and 58 in the cam lobe portion 42 of the cam 40. These apertures 56 and 58 enable the landing cam 48 to be mechanically coupled thereto in a stacked arrangement. In particular, the landing cam 48 is formed with a pair of spaced-apart slots 62 and 64 that are adapted to be aligned with the apertures 56 and 58, respectively, on the stall warning cam 40. The slots 62 and 64 enable the axial position of the landing cam 48 to be adjusted relative to the stall warning cam 40 so that the landing microswitch 52 is actuated when the flaps are configured in a landing configuration, for example, 16° to 18°.

As shown in FIG. 16, a pair of spacers 66 are provided formed, as tubes with a center bore, are aligned with the apertures 56 and 58 in the stall warning cam 40 and the spaced-apart slots 62 and 64 in the landing cam 48. Suitable threaded fasteners 68 and nuts 70 are used to secure the landing cam 48, the spacers 66 and the stall warning 40 to form an assembly. The spacers 66 are selected to provide vertical alignment of the landing cam 48 with respect to the landing microswitch 52 so that the landing cam 48 engages an actuator (not shown) on the landing microswitch 52 when the flaps are configured for landing. Initially, the nuts 70 are not tightened to enable the axial position of the landing cam 48 with respect to the stall warning cam 40 to be adjusted for the desired flap setting, for example, 16° to 18° in accordance with an "Installation Checkout/Ground Test Procedure", Document No. 076-0843, by Sundstrand Data Control, incorporated herein by reference.

The approach cam 50, illustrated in FIG. 12, is likewise rigidly secured to the landing cam 48 in a stacked relationship as illustrated in FIG. 16. In particular, the approach cam 50 includes a pair of spaced-apart slots 72. These slots 72 are adapted to be aligned with spaced-apart apertures 74 formed in the landing cam 48. As best shown in FIG. 16, the approach cam 46 is assembled to the landing cam 48 by way of the spacers 66 and the fastening hardware 68 and 70. In particular, another pair of spacers 66 is aligned with the spaced-apart slots 72 on the approach cam 50 and the spaced-apart apertures 74 on the landing cam 48. Suitable threaded fasteners 68 and nuts 70 are used to secure the approach cam 46, the landing cam 48, as well as the spacers 66. The nuts 70 are initially not tightened to enable the approach cam 50 to be adjusted so that it actuates the approach microswitch 54 when the flaps are configured for approach, for example 5°–7°. In particular, the spaced-apart slots 72 enable axial rotation of the approach cam 50 relative to the landing cam 48 to enable the approach cam 50 to be set for the desired flap setting. After the desired flap setting is attained, the nuts 70 are tightened so that the approach cam 50 is rigidly secured relative to the landing cam 48 in a similar manner as described above.

Referring to FIGS. 5 and 16, the assembly of the stall warning cam 40, landing cam 48 and approach cam 46 is rigidly secured to the rotating bracket 27. In particular, the stall warning cam 40 is formed with oppositely disposed apertures 76 and 78 on the depending leg portion 43. As shown in FIG. 5, the aperture 78 is adapted to receive a suitable fastener 80 which connects the control members 34 to the bracket 27. The other end of the depending leg portion 43 of the stall warning cam 40 is attached to the bracket 27 by way of a suitable fastener 81 received in the aperture 76. With such a configuration, the assembly 82 which includes the stall warning cam 40, the approach cam 50 and the landing cam 48 will rotate with the bracket 27. Thus, any time the flap position is adjusted by the pilot or the co-pilot, the bracket 27 will rotate which, in turn, will cause the flaps to be placed in the desired position. This action will, in turn, cause rotation of the cams 40, 48 and 50 and actuation of the respective microswitches 44, 52 and 54 to provide indications when the flaps are in various positions, such as a stall warning position (e.g., 12°), a landing position (e.g., 16°–18°) or an approach position (e.g., 5°–7°).

In order to coordinate the cam action between the cams 40, 48 and 50, a cam surface 84 (FIG. 10) on the stall warning cam 40 is used to form the cam surfaces 86 and 88 (FIGS. 11 and 12, respectively) on the landing and approach cams 48 and 50, respectively. In particular, as best shown in FIG. 13, the cam surface 86 of the landing cam 48 is formed by superimposing the cam surface 84 of the stall warning cam 40 on the landing cam 48. The cam surface 86 is then formed to the contour of the cam surface 84 of the stall warning cam 40. As shown in FIG. 14, the cam surface 88 of the approach cam 50 is formed in a similar manner. In particular, the cam surface 84 of the stall warning cam 40 is superimposed on the approach cam 48 to enable the cam surface 88 to be formed to follow the contour of the cam surface 84 of the stall warning cam 40. FIG. 15 illustrates the alignment of the cam surfaces 84, 86 and 88 of the stall warning cam 40, landing cam 48 and the approach cam 50, respectively.

In addition, the approach cam 50 is formed not only to actuate the approach microswitch 54 when the flaps are configured for approach, but is formed to maintain the position of the approach microswitch 54 through full flap position. Otherwise, if the approach cam 50 were formed to actuate the microswitch 54 only when the flaps were configured in an approach position, adding more flaps would have the same result as raising the landing gear.

As best shown in FIGS. 6–9, the position of the linkage for the wing flap system and, in particular, the cam assembly 82 is shown for various flap positions. In particular, FIG. 6 illustrates the position of the system in a flaps-up position. FIG. 7 illustrates the position of the system in an approach position. FIG. 8 illustrates the position of the system in a stall warning position, while FIG. 9 illustrates the system in a full-flap position. As shown in FIG. 6, none of the microswitches 44, 52 and 54 are actuated by the cams 40, 46 and 50 when the flaps are configured in a flaps-up position. As the flaps are moved toward an approach position (e.g., 5°–7°), the approach cam 50 actuates the microswitch 54. As the flaps are moved towards the stall warning position (e.g., 12°), the stall warning cam 40 actuates the microswitch 44. As the flaps are moved towards the full-flap position as shown in FIG. 9, the approach cam 50 maintains the actuation of the approach microswitch 54. In addition, the landing cam 48 actuates the landing microswitch 52.

Figure 1A:
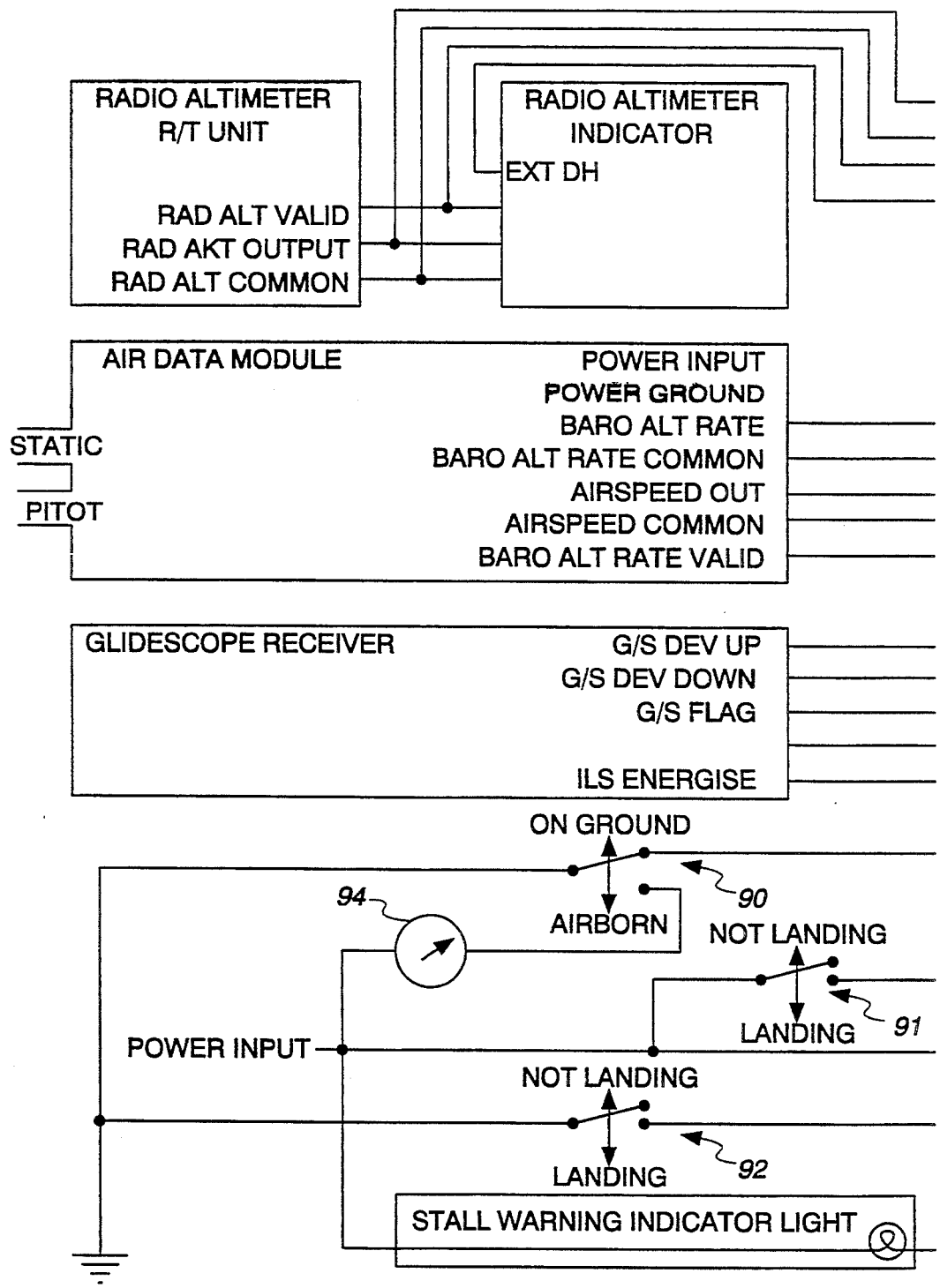
FIGS. 1A–1C represent a block diagram of a ground proximity warning system illustrating the addition of the detecting device in accordance with the present invention for detecting approach, landing and cruise phases of flight in accordance with the present invention.
Figure 1B:
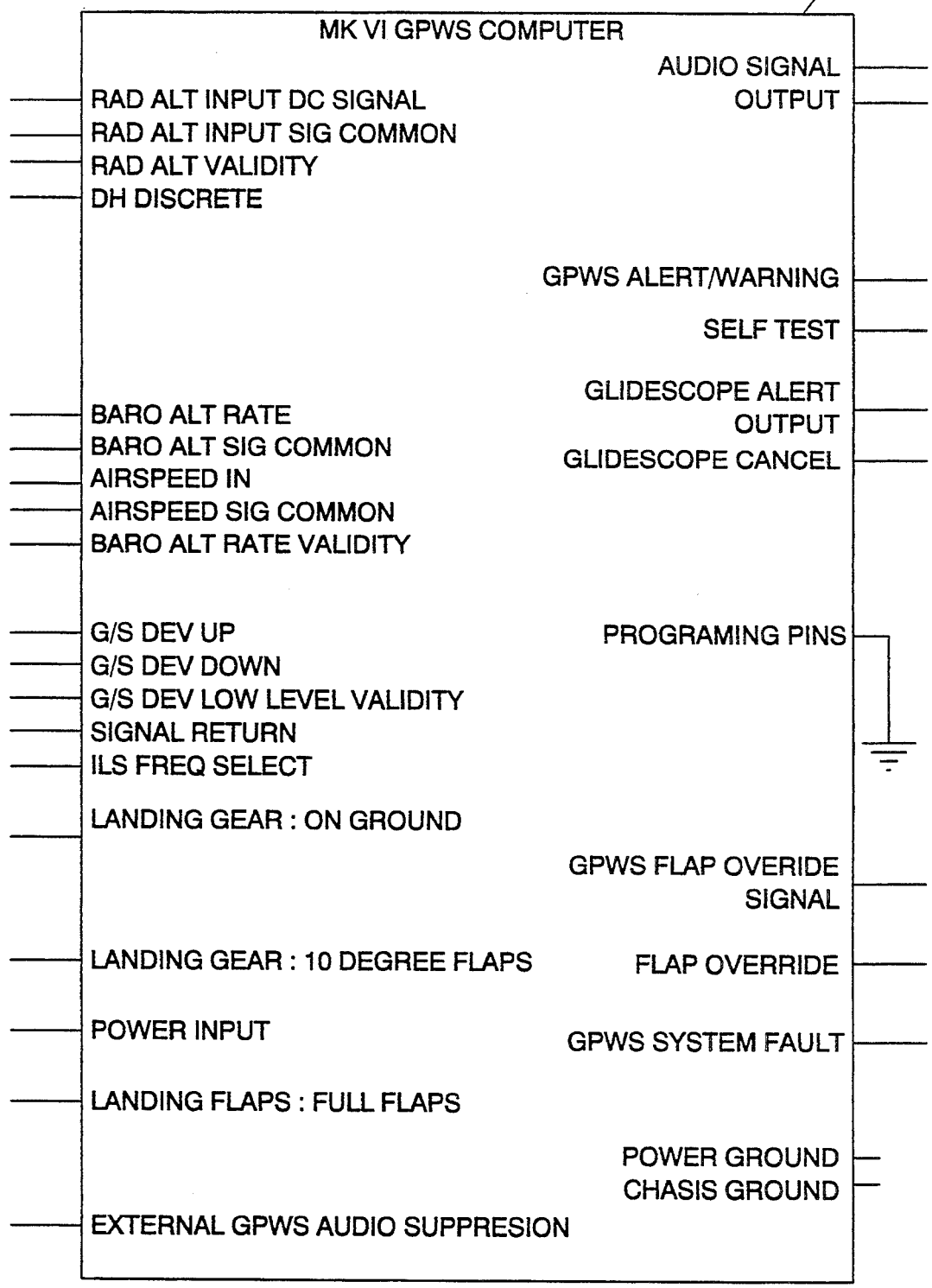
Figure 1C:
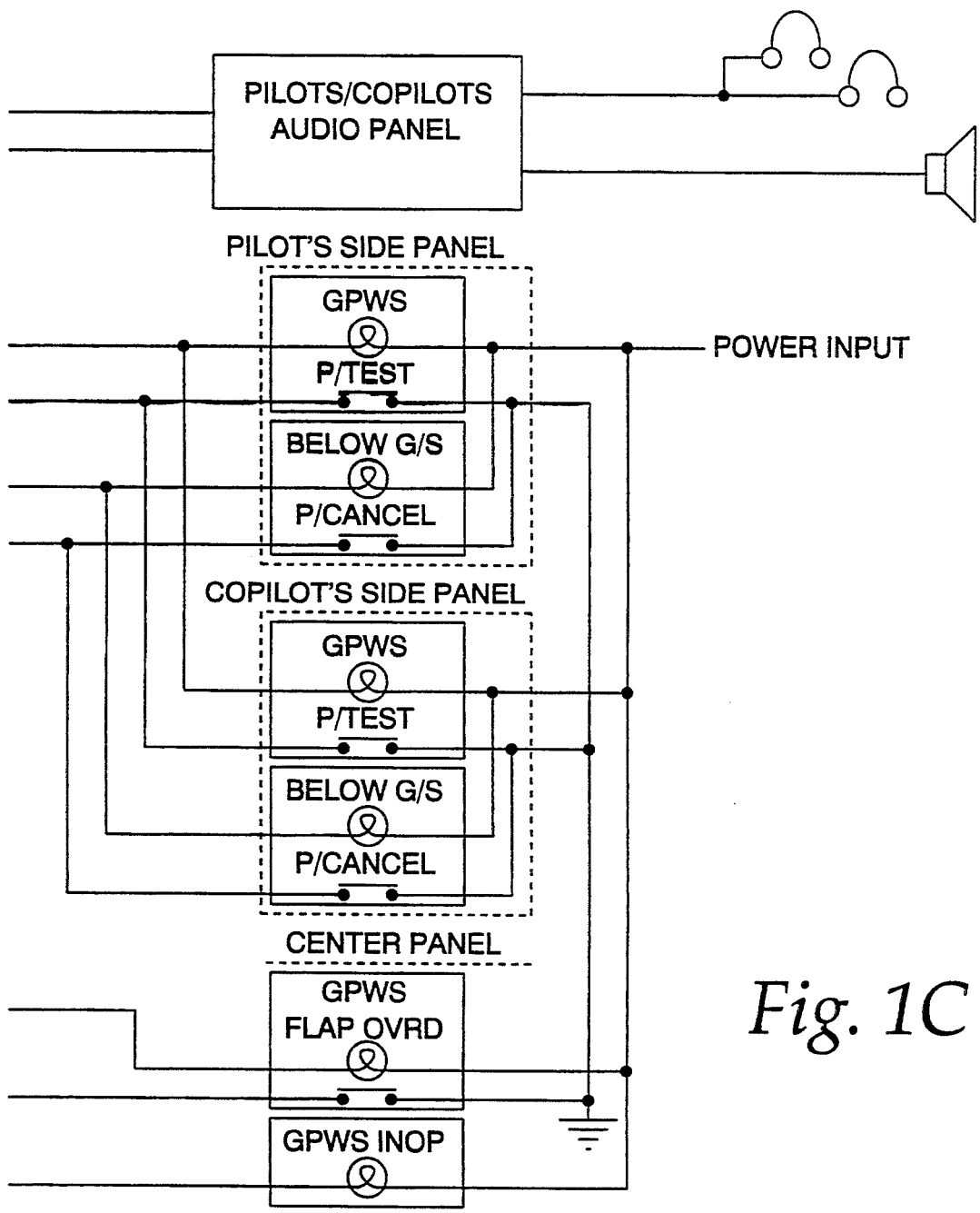
Figure 1D:
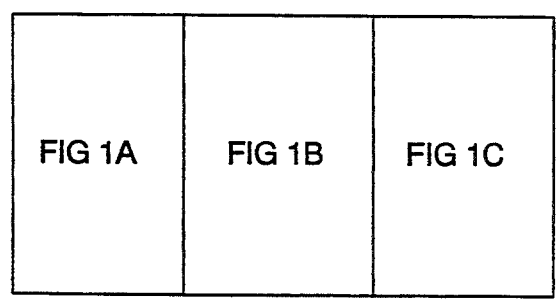
FIG. 1D is a mapping diagram for FIGS. 1A–1C.

The contacts from the landing microswitch 52 and the approach microswitch 54 are applied to the ground proximity warning system, for example, a Mark VI ground proximity warning system computer 55 as furnished by Sundstrand Data Control in Redmond, Washington as illustrated in FIGS. 1A–1C. In particular, the landing microswitch 52 is shown with a single pole, double throw pair of contacts 92. The common pole of the contacts 92 is tied to chassis ground. As shown in FIG. 1A, the contacts 92 are connected to an input; LANDING FLAPS:FULL FLAPS on the ground proximity warning system computer 55. As mentioned above, these contacts 92 will be in a LANDING position shown when the flaps are between 16° and 18°. Otherwise the contacts 92 are in a NOT LANDING position as shown.

An airspeed switch 90, not part of the present invention, having a set of single pole, double throw contacts 90 is connected to an input LANDING GEAR:ON GROUND on the ground proximity warning system computer 55. The airspeed switch 90 is used to drive an elapsed time meter 94 for the purpose of scheduling aircraft maintenance. The contacts from the airspeed switch 90 and the landing microswitch 52 are ORed within the ground proximity warning system computer 55 to enable the ground proximity warning system to be tested either when the aircraft is on the ground or within 50 feet of radio altitude during landing.

Another set of single pole, double throw contacts 91, available from the approach microswitch 54 is applied to the ground proximity warning system computer 55 to an input; LANDING GEAR:10° FLAPS to indicate an approach phase of flight. This input, in conjunction with the LANDING FLAPS:FULL FLAPS input, enables the warning envelopes for the particular ground proximity warning system to be modified during a landing phase of flight while optimizing protection during a cruise phase of flight. By providing an indication to the ground proximity warning system computer of a landing and approach phase of flight, various ground proximity warning systems can be used on aircraft having fixed or non-retractable landing gear, such as a DeHavilland DHC-6 Twin Otter aircraft. Examples of such ground proximity warning systems which are disclosed in U.S. Pat. Nos. 4,030,065; 4,792,799; 4,849,756; 4,939,513; 4,951,047; 4,987,413; 5,038,141; 5,187,478 and 5,220,322. Moreover, it will be understood by those of ordinary skill in the art that the detector 20 for detecting the phase of flight of aircraft having non-retractable landing gear is by no means limited by the above and, in fact, is applicable to virtually any ground proximity warning system that is available for aircraft with retractable landing gear.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A detector for sensing predetermined phases of flight of an aircraft which includes flaps under the control of a predetermined control member and having non-retractable landing gear, comprising:
   first means for detecting when said flaps are configured for an approach phase of flight;
   second means for detecting when said flaps are configured for a landing phase of flight, wherein said first detecting means includes a cam and a corresponding microswitch defining an approach cam and corresponding approach microswitch and said second detecting means includes a cam and a corresponding microswitch defining a landing cam and corresponding landing microswitch, wherein said approach cam is configured to actuate said approach microswitch in a first predetermined position of said flaps representative of an initial approach phase of flight and to maintain the actuation of said approach microswitch through a position of said flaps representative of a full flap position and said landing cam is configured to actuate said landing microswitch in a second predetermined position of said flaps representative of a landing phase of flight.

2. A detector as recited in claim 1, further including first adjustment means for enabling adjustment of the position at which said approach cam actuates said approach microswitch.

3. A detector as recited in claim 2, wherein said first adjustment means includes one or more slots formed in said approach cam.

4. A detector as recited in claim 1, further including second adjustment means for enabling adjustment of the position at which said landing cam actuates said landing microswitch.

5. A detector as recited in claim 4, wherein said second adjustment means includes one or more slots formed in said landing cam.

6. A detector as recited in claim 1, wherein said approach and landing cams are rotatably mounted relative to a predetermined reference point on said aircraft.

7. A detector as recited in claim 1, wherein said approach cam and said landing cams are rigidly mounted relative to each other.

8. A detector as recited in claim 1, wherein said approach and said landing microswitches are rigidly mounted relative to a predetermined reference point on said aircraft configured in a stacked relationship and adapted to cooperate with said approach and landing cams, respectively.

9. A ground proximity warning system for an aircraft with flaps and having non-retractable landing gear, comprising:
   means for detecting predetermined phases of flight of said aircraft, wherein said detecting means comprises
      first means for detecting when said flaps are configured for an approach phase of flight; and
      second means for detecting when said flaps are configured for a landing phase of flight, wherein said first detecting means includes a cam and a corresponding microswitch defining an approach cam and corresponding approach microswitch and said second detecting means includes a cam and a corresponding microswitch defining a landing cam and corresponding landing microswitch, wherein said approach cam is configured to actuate said approach microswitch in a first predetermined position of said flaps representative of an initial approach phase of flight and to maintain the actuation of said approach microswitch through a position of said flaps representative of a full flap position and said landing cam is configured to actuate said landing microswitch in a second predetermined position of said flaps representative of a landing phase of flight;
   means for providing a warning of a dangerous flight condition as a function of a predetermined warning envelope; and
   means responsive to said detecting means for altering said warning envelope for one or more said predetermined phases of flight.

10. A ground proximity warning system as recited in claim 9, wherein said detecting means includes means for monitoring the position of said flaps and providing an indication of one or more predetermined phases of flight as a predetermined function of the position of said flaps.

11. A ground proximity warning system as recited in claim 9, wherein said predetermined phases of flight include a landing phase and an approach phase of flight.

* * * * *